(12) United States Patent
Nallaperumal

(10) Patent No.: US 11,549,707 B2
(45) Date of Patent: Jan. 10, 2023

(54) METHOD AND A SYSTEM FOR CONTROLLING TEMPERATURE IN DIFFERENT ZONES OF A PREMISES

(71) Applicant: Carrier Corporation, Palm Beach Gardens, FL (US)

(72) Inventor: Pirammanayagam Nallaperumal, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 91 days.

(21) Appl. No.: 17/123,214

(22) Filed: Dec. 16, 2020

(65) Prior Publication Data

US 2021/0180814 A1 Jun. 17, 2021

(30) Foreign Application Priority Data

Dec. 17, 2019 (IN) .............................. 201911052390

(51) Int. Cl.
| F24F 11/30 | (2018.01) |
| G05B 15/02 | (2006.01) |
| F24F 11/80 | (2018.01) |
| F24F 11/54 | (2018.01) |
| F24F 11/58 | (2018.01) |
| F24F 11/64 | (2018.01) |
| F24F 11/65 | (2018.01) |
| A62C 2/00 | (2006.01) |
| F24F 120/12 | (2018.01) |

(Continued)

(52) U.S. Cl.
CPC ............... *F24F 11/30* (2018.01); *A62C 2/00* (2013.01); *F24F 11/54* (2018.01); *F24F 11/58* (2018.01); *F24F 11/64* (2018.01); *F24F 11/65* (2018.01); *F24F 11/80* (2018.01); *G05B 15/02* (2013.01); *F24F 2110/10* (2018.01); *F24F 2120/12* (2018.01); *H04W 4/80* (2018.02); *H04W 84/12* (2013.01)

(58) Field of Classification Search
CPC .. F24F 11/30; F24F 11/54; F24F 11/58; F24F 11/64; F24F 11/65; F24F 11/80; F24F 2110/10; F24F 2120/12; A62C 2/00; G05B 15/02; G05B 2219/2614; H04W 4/80; H04W 84/12; H04W 4/38; H04W 4/33; H04W 24/10
See application file for complete search history.

(56) References Cited

U.S. PATENT DOCUMENTS

| 6,970,183 B1 * | 11/2005 | Monroe ................. G08B 7/062 |
| | | 348/E7.086 |
| 2006/0278728 A1 * | 12/2006 | Kates ................... A01G 25/167 |
| | | 239/69 |

(Continued)

*Primary Examiner* — Ramesh B Patel
(74) *Attorney, Agent, or Firm* — Cantor Colburn LLP

(57) ABSTRACT

A system and a method for controlling temperature in different zones of a premises. A method includes receiving a measurement of temperature sensed by a first fire detector positioned at a first zone of a premises. The method further includes receiving a measurement of temperature sensed by a second fire detector positioned at a second zone of the premises. The method also includes controlling the temperature by a thermostat in the first zone based on the measurement of the sensed temperature received from the first fire detector and in the second zone based on the measurement of the sensed temperature received from the second fire detector.

20 Claims, 6 Drawing Sheets

(51) Int. Cl.
  *H04W 84/12* (2009.01)
  *H04W 4/80* (2018.01)
  *F24F 110/10* (2018.01)

(56) References Cited

U.S. PATENT DOCUMENTS

| | | | |
|---|---|---|---|
| 2011/0190952 A1* | 8/2011 | Goldstein | H02J 13/0017 700/291 |
| 2017/0122575 A1* | 5/2017 | Acker | G05B 15/02 |
| 2018/0113577 A1* | 4/2018 | Burns | H04N 21/8549 |
| 2020/0243203 A1* | 7/2020 | Reddy | G16Y 10/80 |
| 2022/0110195 A1* | 4/2022 | Casey | H05B 45/20 |

* cited by examiner

METHOD AND A SYSTEM FOR CONTROLLING TEMPERATURE IN DIFFERENT ZONES OF A PREMISES

FOREIGN PRIORITY

This application claims priority to Indian Patent Application No. 201911052390, filed Dec. 17, 2019, and all the benefits accruing therefrom under 35 U.S.C. § 119, the contents of which in its entirety are herein incorporated by reference.

TECHNICAL FIELD

The present invention generally relates to temperature control systems. More particularly, the invention relates to a system and a method for controlling temperature in different zones of a premises.

BACKGROUND

Different zones/rooms/areas of a premises have individual temperature sensors to sense temperature in each zone. The temperature sensors positioned in each of the zones can transmit readings of the sensed temperature to a thermostat. Based on the readings received from the sensors, the thermostat controls the temperature in each zone. Further, thermostats having in-built temperature sensors may also be installed in each zone for sensing temperature. Based on the sensed temperature, the thermostats may control temperature in each zone. Therefore, a separate thermostat or a separate temperature sensor is required to be installed in each zone for sensing and controlling temperature in each zone. Such an existing solution for sensing temperature in each zone is a costly solution as a separate thermostat or a separate temperature sensor needs to be purchased and installed.

In view of the afore-mentioned problems, there is a need of an efficient and effective system and a method for sensing and controlling temperature in different zones of a premises. There is also a need to provide cost-effective solution for eliminating the need of using a separate thermostat or a separate temperature sensor for sensing temperature in each zone. In order to solve the problems in the existing solutions, a system and a method are disclosed.

SUMMARY

Various embodiments of the invention describe a system for controlling temperature in different zones of a premises. The system comprises a first fire detector, a second fire detector and a thermostat. The first fire detector positioned at a first zone of a premises is adapted to sense temperature in the first zone and is adapted to transmit a measurement of the sensed temperature associated with the first zone to the thermostat. Also, the second fire detector positioned at a second zone of the premises is adapted to sense temperature in the second zone and is adapted to transmit a measurement of the sensed temperature associated with the second zone to the thermostat. The thermostat is further adapted to control temperature in the first zone based on the measurement of the sensed temperature received from the first fire detector and adapted to control temperature in the second zone based on the measurement of the sensed temperature received from the second fire detector.

In an embodiment of the invention, each of the first fire detector and the second fire detector transmit the measurement of the sensed temperature to a server. The server transmits the measurement of the sensed temperature to the thermostat.

In a different embodiment of the invention, each of the first fire detector and the second fire detector transmit the measurement of the sensed temperature to the thermostat through a router.

In an embodiment of the invention, each of the first fire detector and the second fire detector directly transmit the measurement of the sensed temperature to the thermostat through a bluetooth communication or a WiFi communication.

In another embodiment of the invention, each of the first fire detector and the second fire detector transmit the measurement of the sensed temperature to a fire control panel.

In yet another embodiment of the invention, the thermostat transmits a request for the measurement of the sensed temperature to each of the first fire detector and the second fire detector through the server.

In another embodiment of the invention, the thermostat transmits a request for the measurement of the sensed temperature to each of the first fire detector and the second fire detector through the router.

In still another embodiment of the invention, the thermostat directly transmits a request for the measurement of the sensed temperature to each of the first fire detector and the second fire detector.

In a different embodiment of the invention, the thermostat transmits a request for the measurement of the sensed temperature to the fire control panel.

In yet another embodiment of the invention, the thermostat is positioned inside the premises and is connected to each of the first fire detector and the second fire detector.

In another embodiment of the invention, the thermostat controls the temperature in the first zone based on the measurement of the sensed temperature received from the first fire detector and a first pre-defined temperature threshold. Further, the thermostat controls the temperature in the second zone based on the measurement of the sensed temperature received from the second fire detector and a second pre-defined temperature threshold.

In a different embodiment of the invention, the thermostat controls the temperature of the entire premises based on the measurement of the sensed temperature received from the first fire detector, from the second fire detector and/or based on an input provided by a user.

Various embodiments of the invention describe a method for controlling temperature in different zones of a premises. The method comprises steps of receiving a measurement of temperature sensed by a first fire detector positioned at a first zone of a premises. The method also comprises steps of receiving a measurement of temperature sensed by a second fire detector positioned at a second zone of the premises. The method further comprises steps of controlling the temperature by a thermostat in the first zone based on the measurement of the sensed temperature received from the first fire detector and in the second zone based on the measurement of the sensed temperature received from the second fire detector.

In an embodiment of the invention, each of the first fire detector and the second fire detector transmit the measurement of the sensed temperature to a server. The server transmits the measurement of the sensed temperature to the thermostat.

In a different embodiment of the invention, each of the first fire detector and the second fire detector transmit the measurement of the sensed temperature to the thermostat through a router.

In yet another embodiment of the invention, each of the first fire detector and the second fire detector directly transmit the measurement of the sensed temperature to the thermostat through a bluetooth communication or a WiFi communication.

In an embodiment of the invention, each of the first fire detector and the second fire detector transmit the measurement of the sensed temperature to a fire control panel.

In another embodiment of the invention, the thermostat transmits a request for the measurement of the sensed temperature to each of the first fire detector and the second fire detector.

In yet another embodiment of the invention, the thermostat controls the temperature in the first zone based on the sensed temperature received from the first fire detector and a first pre-defined temperature threshold. Further, the thermostat controls the temperature in the second zone based on the sensed temperature received from the second fire detector and a second pre-defined temperature threshold.

In another different embodiment of the invention, a computer readable medium is disclosed for controlling temperature in different zones of a premises. The computer readable medium comprises one or more processors and a memory is coupled to the one or more processors, the memory stores instructions executed by the one or more processors. The one or more processors are configured to receive a measurement of temperature sensed by a first fire detector positioned at a first zone of a premises. The one or more processors are also configured to receive a measurement of temperature sensed by a second fire detector positioned at a second zone of the premises. The one or more processors are further configured to control the temperature by a thermostat in the first zone based on the measurement of the sensed temperature received from the first fire detector and in the second zone based on the measurement of the sensed temperature received from the second fire detector.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Figure 1A:
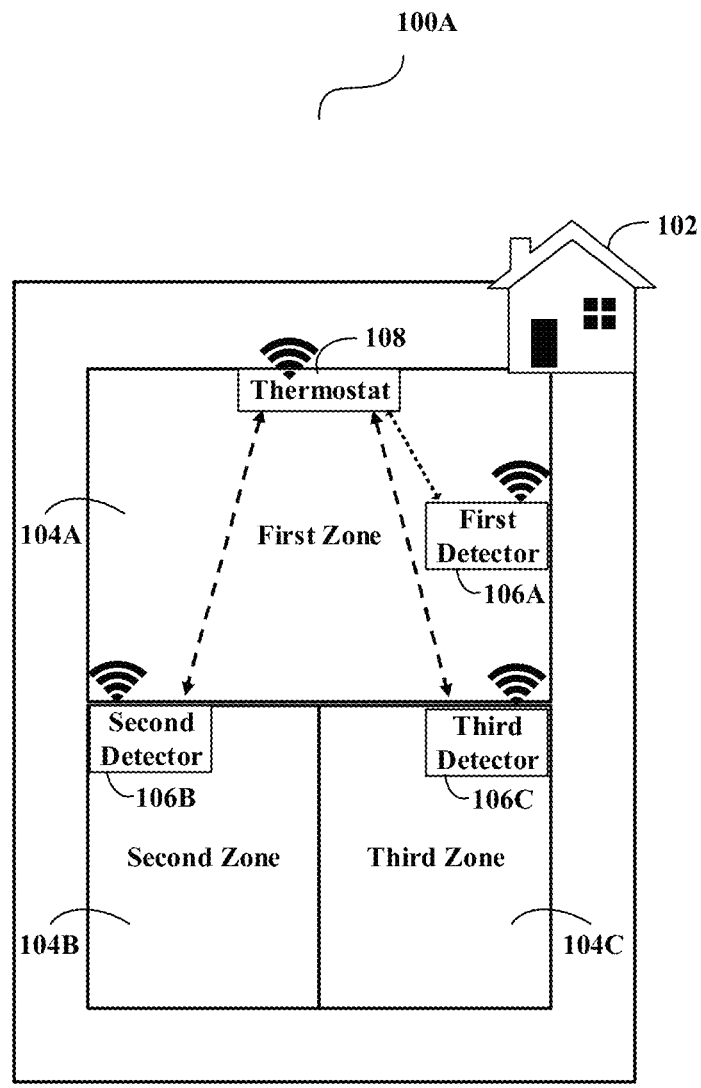
FIG. 1A depicts an exemplary system architecture according to an exemplary first embodiment of the invention.

Described herein is the technology with a system and a method for controlling temperature in different zones of a premises. The premises may have a plurality of zones and may also have a thermostat positioned in the premises. Further, a fire detector may be positioned in each of the plurality of zones and may be connected with the thermostat. The fire detector positioned in each of the plurality of zones may have a built-in temperature sensor or may have the capability to sense temperature in its respective zone. Also, the fire detector may transmit a measurement of the sensed temperature in the respective zone to the thermostat. In an exemplary first embodiment, the fire detector may directly transmit the measurement of the sensed temperature to the thermostat through a wireless network (such as WiFi network, a cellular network or a bluetooth network). In an exemplary second embodiment, the fire detector may transmit the measurement of the sensed temperature to the thermostat through a router positioned in the premises. In an exemplary third embodiment, the fire detector may transmit the measurement of the sensed temperature to the thermostat through a server. In an exemplary fourth embodiment, the fire detector may transmit the measurement of the sensed temperature to the thermostat through a fire control panel. Accordingly, the thermostat may control the temperature in each of the plurality of zones based on the measurement of the sensed temperature received from the fire detector positioned in each of the plurality of zones.

As used herein, the premises may be a home, a building, a bank, an office, a mall, a college, a hospital and/or or any such premises having a plurality of zones. Further, the fire detector may also be located or positioned/installed at each of the plurality of zones inside the premises.

As used herein, the fire detector may be any such detector that is capable of sensing temperature, smoke, carbon monoxide (CO), gas, heat or other causes & effects of fire in a zone of the premises. In an exemplary embodiment, the fire detector may have an in-built temperature sensor to sense the temperature. Further, the fire detector may comprise, but is not limited to, a transmitter, a receiver, fire sensor/s, an alarm unit, a battery, temperature sensor/s, a processor and/or a memory. Each of the plurality of zones may have a fire detector for sensing the temperature in the zone. Further, the fire detector may be connected with the thermostat through various means explained below.

As used herein, the thermostat may be connected with the fire detector positioned in each of the plurality of zones. Specifically, the thermostat may be connected with the fire detector through a network, through a router, through a server or through a fire control panel. In an exemplary embodiment, the thermostat may have an interface to receive input/s from a user for controlling the temperature inside each zone. Alternatively, the user may provide input/s in an application stored in a user device for controlling the temperature inside each zone. The application stored in a memory of the user device may be associated with the thermostat.

As used herein, the user device may store an application associated with the thermostat. The application may be configured to execute different operations performed by the thermostat. The user device may refer to a desktop computer or a hand-held device such as a smartphone with internet connectivity. The internet connectivity may be provided to the user device through a network. The user device may include, but is not limited to, a desktop, workstation PC, a laptop, a smart phone, a tablet, a personal digital assistance, a wearable device, or any such user device that is obvious to a person skilled in the art.

As used herein, the server has processing capabilities as disclosed further in the specification. The server may be a cloud storage, a remote database, or any such storage known in the art.

As used herein, the network may refer to a wired network, a mesh network, a cellular network (such as Global System for Mobile (GSM) network, a Long-Term Evolution (LTE) network, a code-division multiple access (CDMA) network, a narrow-band internet of thing (NB-IoT) technique or category M1 technique)), a short-range network (a bluetooth network, a WiFi network, or a ZigBee network) or any such network/technique that is known in the art.

Throughout the specification, reference numeral 104 depicts each of a plurality of zones in a premises 102. The reference numerals 104A, 104B, 104C may be considered as a different zones in the premises 102 and may be referred as a first zone, a second zone, a third zone, respectively. Likewise, throughout the specification, reference numeral 106 depicts each of one or more fire detectors. The reference numerals 106A-106C may be considered as different fire detectors.

FIG. 1A depicts an exemplary system architecture 100A according to an exemplary first embodiment of the invention. As depicted in FIG. 1A, a premises 102 may have a plurality of zones, namely, a first zone 104A, a second zone 104B, and a third zone 104C. Further, a thermostat 108 may also be positioned anywhere inside the premises 102. Furthermore, as shown, a first fire detector 106A may be installed/positioned in the first zone 104A. Similarly, a second fire detector 106B may be positioned in the second zone 104B. Also, a third fire detector 106C may be positioned in the third zone 104C.

Moreover, the first fire detector 106A may sense temperature in the first zone 104A and may directly transmit a measurement of the sensed temperature in the first zone 104A to a thermostat 108 using a Wi-Fi network, a bluetooth network or a cellular network. Similarly, the second fire detector 106B may also sense temperature in the second zone 104B and may directly transmit a measurement of the sensed temperature in the second zone 104B to the thermostat 108 using a Wi-Fi network, a bluetooth network or a cellular network. Likewise, the third fire detector 106C may sense temperature in the third zone 104C and may directly transmit a measurement of the sensed temperature in the third zone 104C to the thermostat 108 using a Wi-Fi network, a bluetooth network or a cellular network. In an exemplary embodiment, each of the fire detectors 106 may periodically transmit the measurement of the sensed temperature in its respective zones 104 to the thermostat 108 through a network. For an instance, the fire detectors 106 may transmit the measurement of the sensed temperature to the thermostat 108 in every 30 minutes. In a different exemplary embodiment, each of the fire detectors 106 may transmit the measurement of the sensed temperature to the thermostat 108 based on an occurrence of an event. For an instance, the fire detectors 106 may transmit the measurement of the sensed temperature to the thermostat 108 when the thermostat 108 transmits a request (for the measurement of the sensed temperature in its respective zones 104) to the fire detectors 106 through the network. This embodiment of the invention provides a technical advantage of using already-installed fire detector/s to sense temperature in a zone. In this way, the usage of the fire detector/s for sensing temperature eliminates the usage of installing and using temperature sensor/s only for sensing temperature zone.

On receiving the measurement of the sensed temperature, the thermostat 108 may control the temperature in the first zone 104A, the second zone 104B and/or the third zone 104C based on the measurement of the sensed temperature received from the first fire detector 106A, the second fire detector 106B, and/or the third fire detector 106C. Specifically, the thermostat 108 may control the temperature in each zone 104 by comparing the measurement of the sensed temperature received from the first fire detector 106A, the second fire detector 106B, and/or the third fire detector 106C with a first pre-defined temperature threshold, a second pre-defined temperature threshold and/or a third pre-defined temperature threshold, respectively. Also, the thermostat 108 may control the temperature in each zone 104 based on an input provided by a user. Such an input may be provided through an application associated with the thermostat 108 or through an interface of the thermostat 108. This has been explained with an example in Table 1 below. As used herein, the first pre-defined temperature threshold, the second pre-defined temperature threshold and the third pre-defined temperature threshold may be defined by a user using an application associated with the thermostat 108 and stored in a user device of the user. Alternatively, the first pre-defined temperature threshold, the second pre-defined temperature threshold and the third pre-defined temperature threshold may be defined by a user using an interface provided in the thermostat 108.

TABLE 1

Premises 102

| | | | Action by Thermostat 108 |
|---|---|---|---|
| Measurement of the sensed temperature from the first fire detector 106A in the first zone 104A | 22° Celsius | Difference between sensed temperature and the first pre-defined temperature threshold is 2° Celsius | Decrease temperature in first zone 104A by 2° Celsius |
| First pre-defined temperature threshold for the first zone 104A | 20° Celsius | | |
| Measurement of the sensed temperature from the second fire detector 106B in the second zone 104B | 18° Celsius | Difference between sensed temperature and the second pre-defined temperature threshold is 7° Celsius | Increase temperature in second zone 104B by 7° Celsius |
| Second pre-defined temperature threshold for the second zone 104B | 25° Celsius | | |
| Measurement of the sensed temperature from the third fire detector 106C in the third zone 104C | 24° Celsius | No Difference | No change in temperature in third zone 104C |
| Third pre-defined temperature threshold for the third zone 104C | 24° Celsius | | |

Considering an exemplary Table 1 above, the thermostat 108 may compare the measurement (i.e. 22° Celsius) of the sensed temperature received from the first fire detector 106A with the first pre-defined temperature threshold (i.e. 20°

Celsius). In this case, the thermostat 108 may decrease temperature in the first zone 104A by 2° Celsius. Similarly, the thermostat 108 may compare the measurement (i.e. 18° Celsius) of the sensed temperature received from the second fire detector 106B with the second pre-defined temperature threshold (i.e. 25° Celsius) and may increase temperature in the second zone 104A by 7° Celsius. In the last case, the thermostat 108 may not increase or decrease temperature in the third zone 104C as the measurement (i.e. 24° Celsius) of the sensed temperature received from the third fire detector 106C and the third pre-defined temperature threshold (i.e. 24° Celsius) are equal. When the thermostat 108 determines to control (i.e. increase or decrease) the temperature in any of the zone 104, the thermostat 108 may provide a command/instruction to a heating, ventilation, and air conditioning (HVAC) system of the premises 102 for accordingly performing the required cooling or heating in each zones 104 of the premises 102.

Figure 1B:
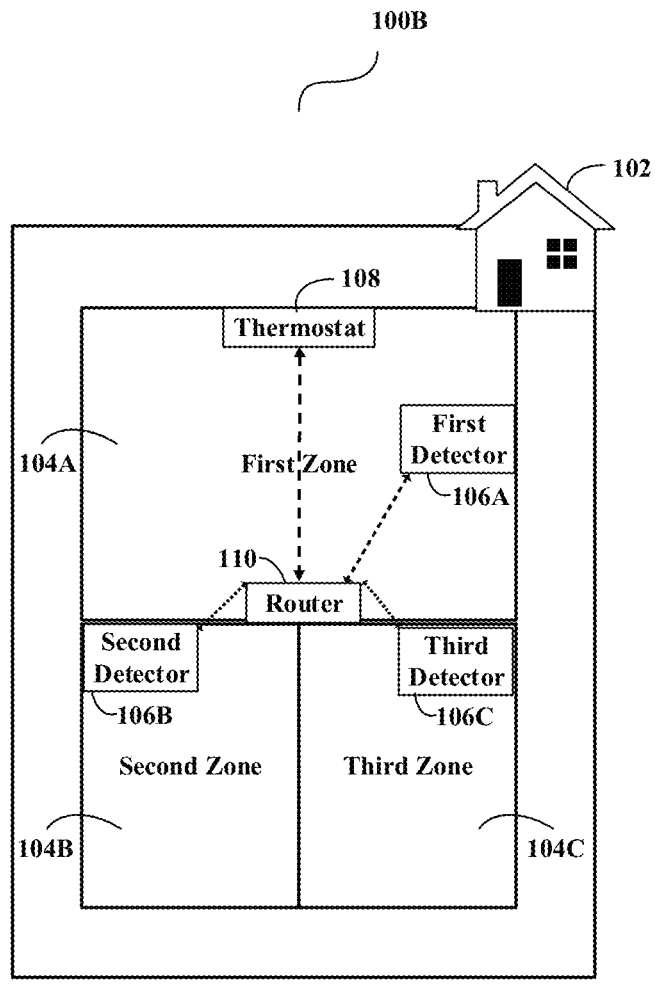
FIG. 1B depicts an exemplary system architecture according to an exemplary second embodiment of the invention.

FIG. 1B depicts an exemplary system architecture 100B according to an exemplary second embodiment of the invention. In this exemplary second embodiment, a thermostat 108 and each of fire detector 106 may be connected through a router 110 and any communication between the thermostat 108 and each of fire detector 106 may take place through the router 110. As can be seen in FIG. 1B, a first fire detector 106A may sense temperature in a first zone 104A and may transmit a measurement of the sensed temperature in the first zone 104A to a thermostat 108 through a router 110. Similarly, a second fire detector 106B may also sense temperature in a second zone 104B and may transmit a measurement of the sensed temperature in the second zone 104B to the thermostat 108 through the router 110. Also, a third fire detector 106C may sense temperature in a third zone 104C and may transmit a measurement of the sensed temperature in the third zone 104C to the thermostat 108 through the router 110.

On receiving the measurement of the sensed temperature, the thermostat 108 may control the temperature in the first zone 104A, the second zone 104B and/or the third zone 104C based on the measurement of the sensed temperature received from the first fire detector 106A, the second fire detector 106B, the third fire detector 106C and/or an input provided by a user as explained above in FIG. 1A.

Figure 1C:
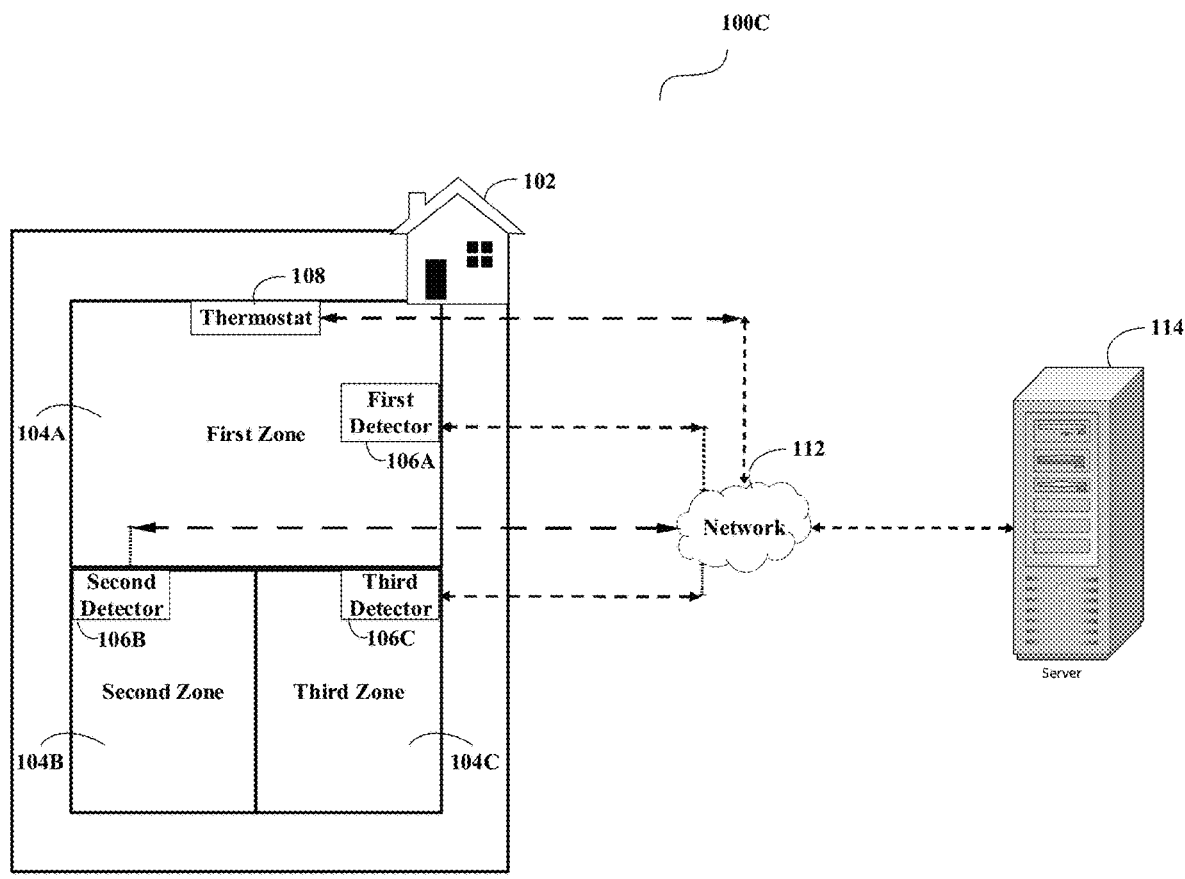
FIG. 1C depicts an exemplary system architecture according to an exemplary third embodiment of the invention.

FIG. 1C depicts an exemplary system architecture 100C according to an exemplary third embodiment of the invention. In this exemplary third embodiment, each of fire detector 106 may be connected with a server/cloud 114 through a network 112 and a thermostat 108 may also be connected with the server 114 through the network 112. Also, any communication between the thermostat 108 and each of fire detector 106 may take place through the server 114. As can be seen in FIG. 1C, a first fire detector 106A may sense temperature in a first zone 104A and may transmit a measurement of the sensed temperature in the first zone 104A to the server 114 using a network 112. Similarly, a second fire detector 106B may also sense temperature in a second zone 104B and may transmit a measurement of the sensed temperature in the second zone 104B to the server 114 using the network 112. Also, a third fire detector 106C may sense temperature in a third zone 104C and may transmit a measurement of the sensed temperature in the third zone 104C to the server 114 using the network 112.

Moreover, as depicted in FIG. 1C, the thermostat 108 may transmit a request to the server 114 using the network 112 for providing the measurement of the sensed temperature of the first fire detector 106A, the second fire detector 106B and/or the third fire detector 106C. On receiving the request from the thermostat 108, the server 114 may transmit the measurement of the sensed temperature of the first fire detector 106A, the second fire detector 106B and/or the third fire detector 106C to the thermostat 108 using the network 112. On receiving the measurement of the sensed temperature from the server 114, the thermostat 108 may accordingly control the temperature in the first zone 104A, the second zone 104B, and/or the third zone 104C based on the measurement of the sensed temperature received from the first fire detector 106A, the second fire detector 106B, the third fire detector 106C and/or an input provided by a user as explained above in FIG. 1A.

Figure 1D:
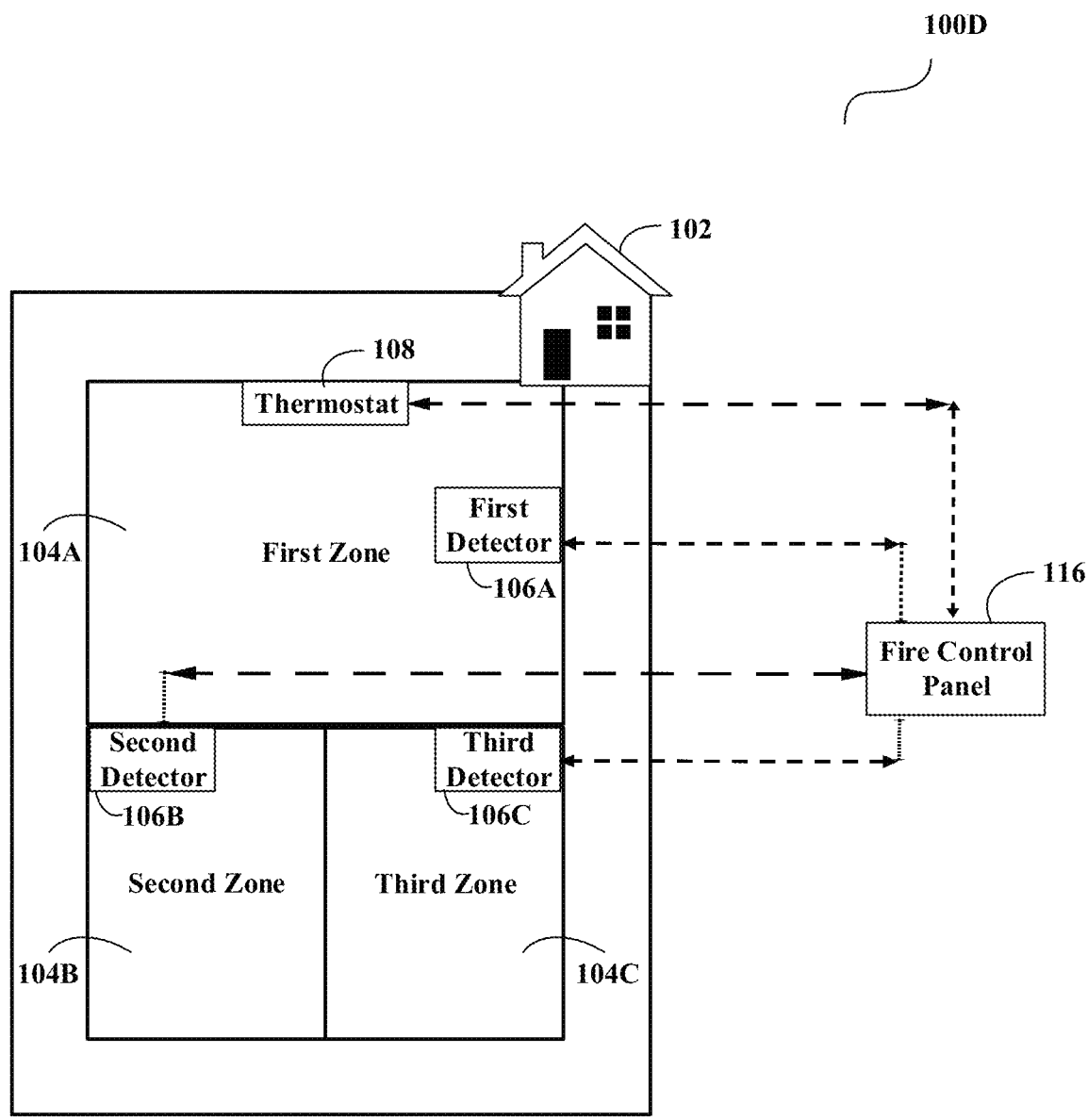
FIG. 1D depicts an exemplary system architecture according to an exemplary fourth embodiment of the invention.

FIG. 1D depicts an exemplary system architecture 100D according to an exemplary fourth embodiment of the invention. In this exemplary fourth embodiment, each of fire detector 106 may be connected with a fire control panel 116 and a thermostat 108 may also be connected with the fire control panel 116 through a wired network or a wireless network. Also, any communication between the thermostat 108 and each of the fire detector 106 may take place through the fire control panel 116. As can be seen in FIG. 1D, a first fire detector 106A may sense temperature in a first zone 104A and may transmit a measurement of the sensed temperature in the first zone 104A to the fire control panel 116. Similarly, a second fire detector 106B may also sense temperature in a second zone 104B and may transmit a measurement of the sensed temperature in the second zone 104B to the fire control panel 116. Further, a third fire detector 106C may sense temperature in a third zone 104C and may transmit a measurement of the sensed temperature in the third zone 104C to the fire control panel 116.

Moreover, as depicted in FIG. 1D, the thermostat 108 may transmit a request to the fire control panel 116 for providing the measurement of the sensed temperature of the first fire detector 106A, the second fire detector 106B and/or the third fire detector 106C. On receiving the request from the thermostat 108, the fire control panel 116 may transmit the measurement of the sensed temperature of the first fire detector 106A, the second fire detector 106B and/or the third fire detector 106C to the thermostat 108 using the Wi-Fi network, the bluetooth network or the like. In an alternative embodiment, the measurement of the sensed temperature may be automatically sent to the thermostat 108 without any request from the thermostat 108. On receiving the measurement of the sensed temperature from the fire control panel 116, the thermostat 108 may accordingly control the temperature in the first zone 104A, the second zone 104B and/or the third zone 104C based on the measurement of the sensed temperature received from the first fire detector 106A, the second fire detector 106B, the third fire detector 106C and/or an input provided by a user as explained above in FIG. 1A. Although the FIGS. 1A, 1B, 1C and 1D show three zones 104A, 104, 104C inside a premises 102; however, it is understood for a person skilled in the art that any number of zones may be present inside the premises 102. Although the exemplary Table 1 shows exemplary values of the measurement of temperature sensed by three fire detectors 106A, 106, 106C in three zones 104A, 104, 104C inside the premises 102; however, it is understood for a person skilled in the art that any other variations/modification in exemplary Table 1 are within the scope of the invention.

The present invention further encompasses an interface in the thermostat 108 and/or an application stored in a user device to display each of the measurement of the sensed temperature of the first fire detector 106A in the first zone 104A, the second fire detector 106B in the second zone 104B and/or the third fire detector 106C in the third zone 104D. In addition, the interface and/or the application may also display the first pre-defined temperature threshold for the first zone 104A, the second pre-defined temperature threshold for the second zone 104B and the third pre-defined temperature threshold for the third zone 104D. Further, the application may also be pre-configured with an identifier and a location associated with each of the fire detectors 106 positioned at the plurality of zones 104 inside the premises 102. Furthermore, each of the fire detectors 106 may also transmit its identifier along with the measurements of the sensed temperature to the thermostat 108 or the application. It is to be noted that the present invention is also applicable where the premises 102 have a single zone. In the single zone, the present invention may enable the thermostat 108 to control the temperature of the entire premises 102 with respect to a current temperature at a particular zone in the premises 102 and based on an input provided by a user.

Figure 2:
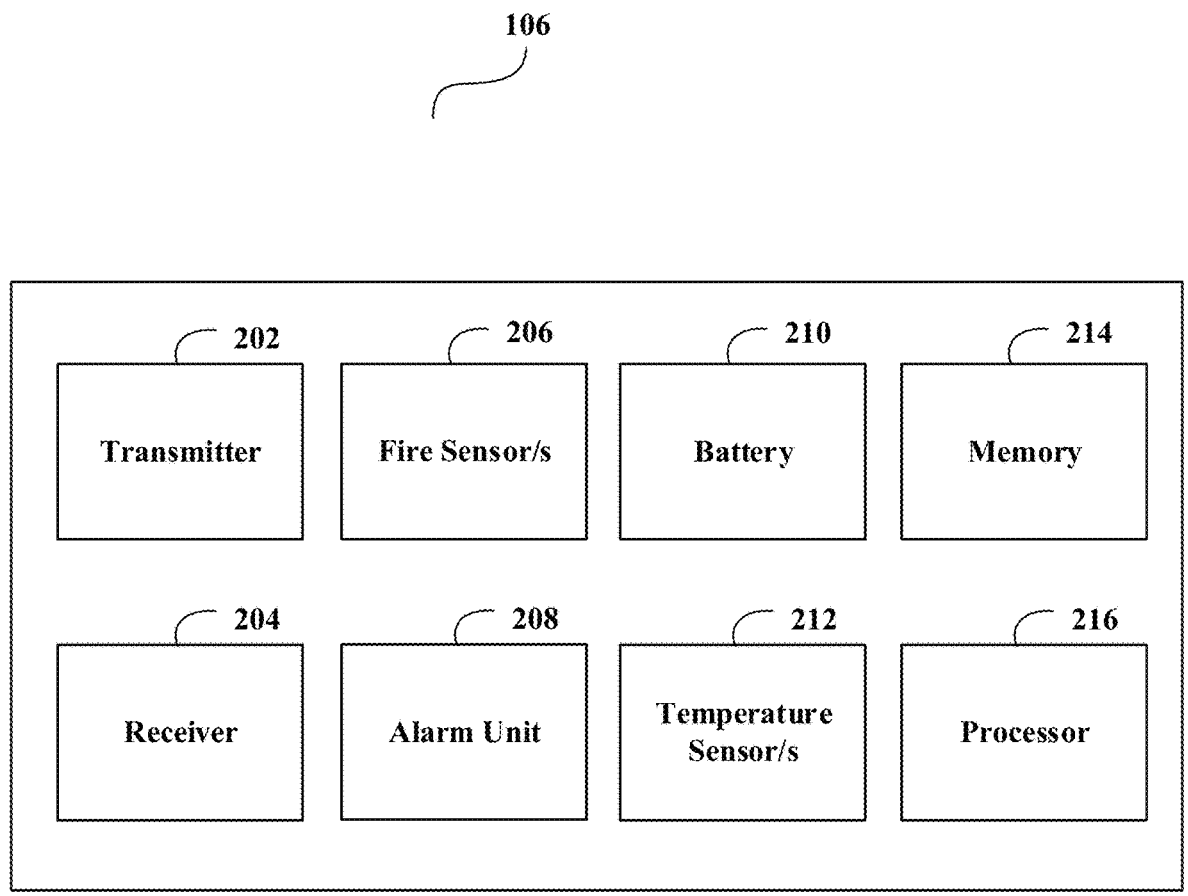
FIG. 2 depicts block diagram of different components of an exemplary detector according to an exemplary embodiment of the invention.

FIG. 2 depicts block diagram of different components of an exemplary fire detector 106 according to an exemplary embodiment of the invention. The fire detector 106 may comprise, but is not limited to, a transmitter 202, a receiver 204, fire sensor/s 206, an alarm unit 208, a battery 210, temperature sensor/s 212, a memory 214 and/or a processor 216. The temperature sensor/s 212 may be adapted to sense temperature in a zone 104 where the fire detector 106 is positioned. The temperature sensor/s 212 may also communicate a measurement of the sensed temperature of the zone 104 to the transmitter 202. The transmitter 202 may be adapted to transmit the measurement of the sensed temperature to a thermostat 108 as explained above in FIG. 1A, FIG. 1B, FIG. 1C and FIG. 1D. The receiver 204 may be adapted to receive a request from the thermostat 108 for providing the measurement of the sensed temperature. The fire sensor/s 206 may be adapted to detect fire in the zone 104 using techniques known to a person skilled in the art. Also, the alarm unit 208 may be adapted to output or produce an alarm when the fire sensor/s 206 detects fire in the zone 104. The battery 210 may be adapted to provide power to the fire detector 106. Further, the memory 214 may be adapted to measurement/s of the sensed temperature, an identifier of the fire detector 106 and/or an identifier of the thermostat 108.

Moreover, the transmitter 202, the receiver 204, the fire sensor/s 206, the alarm unit 208, the battery 210, the temperature sensor/s 212, and/or the memory 214 may be communicably coupled with the processor 216. The different units described herein are exemplary. The invention may be performed using one or more units. For example, the tasks executed by the transmitter 202, the receiver 204, the fire sensor/s 206, the alarm unit 208, the battery 210, the temperature sensor/s 212, the memory 214 and/or the processor 216 may be performed by a single unit. Alternatively more number of units as described herein may be used to perform the present invention.

Figure 3:
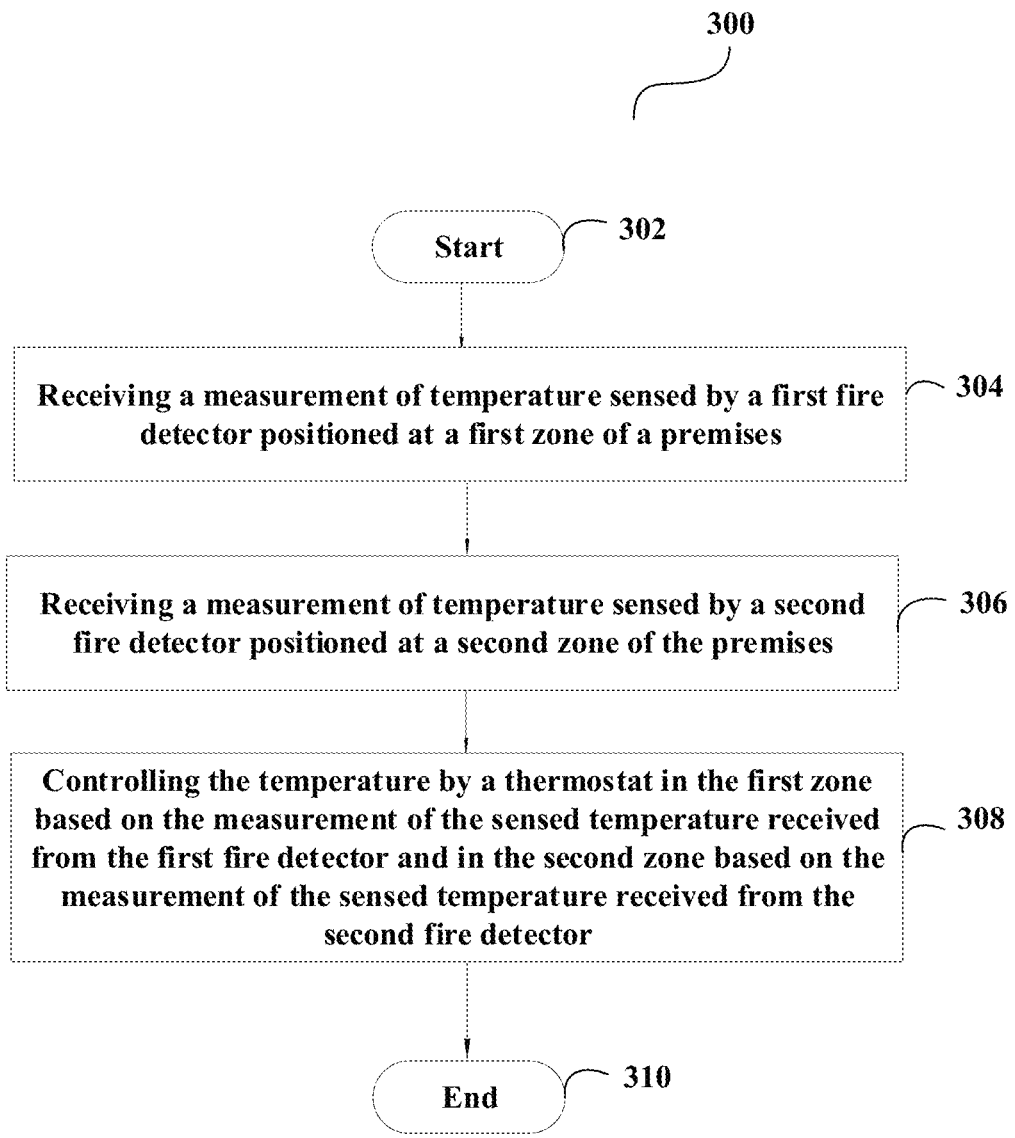
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being for controlling temperature in different zones of a premises. The method flowchart 300 starts at step 302.

At step 304, a thermostat 108 may receive a measurement of temperature sensed by a first fire detector 106A positioned at a first zone 104A of a premises 102. This has been explained in FIG. 1A, FIG. 1B, FIG. 1C and FIG. 1D in greater detail.

At step 306, the thermostat 108 may also receive a measurement of temperature sensed by a second fire detector 106B positioned at a second zone 104B of the premises 102. This has been explained in FIG. 1A, FIG. 1B, FIG. 1C and FIG. 1D in greater detail.

At step 308, the thermostat 108 may control the temperature in the first zone 104A based on the measurement of the sensed temperature received from the first fire detector 106A and in the second zone 104B based on the measurement of the sensed temperature received from the second fire detector 106B. This has been explained in FIG. 1A and Table 1 in greater detail. Then, the method flowchart 300 may end at 310.

The present invention is applicable in various industries/fields such as, but is not limited to, banking industry, hospitality industry, building/construction industry, offices, universities, hospitals, colleges, homes and any such industry/field that is well known in the art and where fire detector/s in each zone may be positioned.

The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a thermostat 108. A computer readable medium comprises one or more processors and a memory coupled to the one or more processors, the memory stores instructions executed by the one or more processors. The one or more processors are configured to receive a measurement of temperature sensed by a first fire detector 106A positioned at a first zone 104A of a premises 102. The one or more processors are also configured to receive a measurement of temperature sensed by a second fire detector 106B positioned at a second zone 104B of the premises 102. The one or more processors are also configured to control the temperature by a thermostat 108 in the first zone 104A based on the measurement of the sensed temperature received from the first fire detector 106A and in the second zone 104B based on the measurement of the sensed temperature received from the second fire detector 106B.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
a first fire detector positioned at a first zone of a premises adapted to sense temperature in the first zone and adapted to transmit a measurement of the sensed temperature associated with first zone to a thermostat;
a second fire detector positioned at a second zone of the premises adapted to sense temperature in the second zone and adapted to transmit a measurement of the sensed temperature associated with the second zone to the thermostat; and
the thermostat adapted to control temperature in the first zone based on the measurement of the sensed temperature received from the first fire detector and adapted to control temperature in the second zone based on the measurement of the sensed temperature received from the second fire detector.

2. The system of claim 1, wherein each of the first fire detector and the second fire detector transmit the measurement of the sensed temperature to a server, wherein the server transmits the measurement of the sensed temperature to the thermostat.

3. The system of claim 1, wherein each of the first fire detector and the second fire detector transmit the measurement of the sensed temperature to the thermostat through a router.

4. The system of claim 1, wherein each of the first fire detector and the second fire detector directly transmit the measurement of the sensed temperature to the thermostat through a bluetooth communication or a WiFi communication.

5. The system of claim 1, wherein each of the first fire detector and the second fire detector transmit the measurement of the sensed temperature to a fire control panel.

6. The system of claim 2, wherein the thermostat transmits a request for the measurement of the sensed temperature to each of the first fire detector and the second fire detector through the server.

7. The system of claim 3, wherein the thermostat transmits a request for the measurement of the sensed temperature to each of the first fire detector and the second fire detector through the router.

8. The system of claim 4, wherein the thermostat directly transmits a request for the measurement of the sensed temperature to each of the first fire detector and the second fire detector.

9. The system of claim 5, wherein the thermostat transmits a request for the measurement of the sensed temperature to the fire control panel.

10. The system of claim 1, wherein the thermostat is positioned inside the premises and is connected to each of the first fire detector and the second fire detector.

11. The system of claim 1, wherein the thermostat controls the temperature in the first zone based on the measurement of the sensed temperature received from the first fire detector and a first pre-defined temperature threshold, wherein the thermostat controls temperature in the second zone based on the measurement of the sensed temperature received from the second fire detector and a second pre-defined temperature threshold.

12. The system of claim 1, wherein the thermostat controls the temperature of the entire premises based on the measurement of the sensed temperature received from the first fire detector, from the second fire detector and/or based on an input provided by a user.

13. A method comprising:
receiving a measurement of temperature sensed by a first fire detector positioned at a first zone of a premises;
receiving a measurement of temperature sensed by a second fire detector positioned at a second zone of the premises; and
controlling the temperature by a thermostat in the first zone based on the measurement of the sensed temperature received from the first fire detector and in the second zone based on the measurement of the sensed temperature received from the second fire detector.

14. The method of claim 13, wherein each of the first fire detector and the second fire detector transmit the measurement of the sensed temperature to a server, wherein the server transmits the measurement of the sensed temperature to the thermostat.

15. The method of claim 13, wherein each of the first fire detector and the second fire detector transmit the measurement of the sensed temperature to the thermostat through a router.

16. The method of claim 13, wherein each of the first fire detector and the second fire detector directly transmit the measurement of the sensed temperature to the thermostat through a bluetooth communication or a WiFi communication.

17. The method of claim 13, wherein each of the first fire detector and the second fire detector transmit the measurement of the sensed temperature to a fire control panel.

18. The method of claim 13, wherein the thermostat transmits a request for the measurement of the sensed temperature to each of the first fire detector and the second fire detector.

19. The method of claim 13, wherein the thermostat controls the temperature in the first zone based on the sensed temperature received from the first fire detector and a first pre-defined temperature threshold, wherein the thermostat controls the temperature in the second zone based on the sensed temperature received from the second fire detector and a second pre-defined temperature threshold.

20. A computer readable medium comprising one or more processors and a memory coupled to the one or more processors, the memory storing instructions executed by the one or more processors, the one or more processors configured to:
receive a measurement of temperature sensed by a first fire detector positioned at a first zone of a premises;
receive a measurement of temperature sensed by a second fire detector positioned at a second zone of the premises; and
control the temperature by a thermostat in the first zone based on the measurement of the sensed temperature received from the first fire detector and in the second zone based on the measurement of the sensed temperature received from the second fire detector.

* * * * *